United States Patent
Julson et al.

(10) Patent No.: US 11,239,534 B2
(45) Date of Patent: Feb. 1, 2022

(54) COMPRESSION CLAMP BATTERY CONNECTION SYSTEM

(71) Applicant: GM GLOBAL TECHNOLOGY OPERATIONS LLC, Detroit, MI (US)

(72) Inventors: Timothy D. Julson, Rochester Hills, MI (US); Leonard G. Posh, Canton, MI (US); Agustin Velazquez Mejia, Macomb, MI (US); Brian J. Scigiel, Keego Harbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 457 days.

(21) Appl. No.: 16/215,973

(22) Filed: Dec. 11, 2018

(65) Prior Publication Data

US 2020/0185692 A1    Jun. 11, 2020

(51) Int. Cl.
*H01M 2/30* (2006.01)
*H01M 50/543* (2021.01)
*H01M 50/116* (2021.01)

(52) U.S. Cl.
CPC ....... *H01M 50/543* (2021.01); *H01M 50/116* (2021.01)

(58) Field of Classification Search
CPC ........ H01M 2/30; H01M 2/02; H01M 50/543; H01M 50/116; Y02E 60/10
See application file for complete search history.

(56) References Cited

U.S. PATENT DOCUMENTS

| | | | | |
|---|---|---|---|---|
| 4,042,759 A | * | 8/1977 | Cella | H01R 11/281 429/121 |
| 4,560,230 A | * | 12/1985 | Inglis | H01M 50/543 439/890 |
| 9,093,768 B1 | * | 7/2015 | Freitag | H01M 50/543 |
| 2005/0250390 A1 | * | 11/2005 | MacDonald | H01R 11/282 439/759 |
| 2007/0015052 A1 | * | 1/2007 | Munoz | H01M 50/543 429/178 |
| 2009/0191454 A1 | * | 7/2009 | Detter | H01M 50/502 429/121 |
| 2015/0000122 A1 | * | 1/2015 | Hennessy | H01R 43/26 29/825 |
| 2016/0203935 A1 | * | 7/2016 | Onoda | H01M 50/572 337/1 |

FOREIGN PATENT DOCUMENTS

| | | | |
|---|---|---|---|
| DE | 2933234 | * | 12/2017 |
| GB | 471168 | * | 11/1935 |
| WO | WO 2018148641 | * | 8/2018 |

* cited by examiner

*Primary Examiner* — Alexander Usyatinsky
(74) *Attorney, Agent, or Firm* — Lorenz & Kopf LLP

(57) ABSTRACT

A battery connection system includes a conductor configured to connect with a battery that has a post. An inner clamp element has a wall that is shaped to mate with the post and that defines a hollow interior and an exterior. The wall has a notch defining a void in the wall. An outer clamp element mates with the exterior of the wall of the inner clamp element to reduce the size of the void to secure the conductor to the battery.

20 Claims, 4 Drawing Sheets

COMPRESSION CLAMP BATTERY CONNECTION SYSTEM

INTRODUCTION

The present disclosure generally relates to battery terminal connections, and more particularly relates to a compression clamp connection system for securely and releasably connecting a battery with a conductor.

Various battery terminal connection systems exist for connecting a cable to a battery so that power from the battery flows to its intended load through the cable with good conductivity. A secure, reliable and durable connection is needed to ensure uninterrupted power flows from the battery to its load. In a typical application, the battery connection may be disconnected so that the battery may be removed and replaced. A common approach for applications such as vehicle batteries uses a solid cylindrical post that extends from the battery and a clevis-type terminal clamp that encircles the post and is connected with the cable. For example, the typical terminal clamp has a connection to the cable on one side of the post and a pair of arms opposed across a gap on the opposite side of the post. A bolt is typically used to squeeze the arms together reducing the size of the gap and squeeze clamp onto the post. Typically, the clamp is made of a soft malleable metal that is easily deformed. This type of clamp may bend, slip and unintentionally disconnect from the battery when exposed to impact loads. In some applications, an uninterrupted battery connection is preferred so that accessories continue to function even after impacts. In addition, a typical battery connection degrades over time due to corrosion and wear, which may lead to a reduction in conduction from the battery to the cable. For example, when the typical clamp ages, it often has a degraded terminal contact area, especially when the clamp has been repeatedly disconnected and reconnected.

Accordingly, it is desirable to provide improved battery connections that remain attached under applied impact forces and that provide for reliable contact between the battery post and the cable clamp over a long lifespan. Other desirable features and characteristics of the present invention will become apparent from the subsequent detailed description and the appended claims, taken in conjunction with the accompanying drawings and the foregoing technical field and background.

SUMMARY

In a number of embodiments, a battery connection system includes a conductor configured to connect with a battery that has a post. An inner clamp element has a wall that defines a hollow interior and an exterior. The wall has a notch defining a void in the wall. An outer clamp element mates with the exterior of the wall of the inner clamp element and is configured to reduce the size of the void to secure the conductor to the battery.

In additional embodiments, the conductor is connected to the inner clamp element.

In additional embodiments, the outer clamp element is configured to engage with the inner clamp element and to compress the inner clamp element against the post.

In additional embodiments, the inner clamp element has a feature projecting into the hollow interior, wherein the feature is configured to inhibit vertical movement of the inner clamp element when the outer clamp element is mated with the inner clamp element.

In additional embodiments, the inner clamp element includes an annular segment and a polygonal segment that has flat sides and is disposed adjacent the annular segment.

In additional embodiments, the inner clamp element includes a connector configured to mate with the conductor.

In additional embodiments, the outer clamp element includes an annular segment and a polygonal segment that has flat sides and is disposed adjacent the annular segment.

In additional embodiments, the inner clamp element has a rib projecting into the hollow interior and threads on the exterior of the wall. The notch extends through and bisects the rib and the threads.

In additional embodiments, the wall includes external threads that are tapered, and the outer clamp element includes internal threads that are tapered and that mate with the external threads.

In additional embodiments, the external threads taper so that the outer clamp element is configured, when threaded onto the inner clamp element, to increasingly close the notch and tighten the inner clamp element on the post.

In a number of other embodiments, a battery connection system includes a conductor configured to connect with a battery that has a post. An inner clamp element has a wall that is shaped to mate with the post and that defines a hollow interior and an exterior. The wall has a notch defining a void in the wall. The conductor is connected with the inner clamp element. An outer clamp element mates with the exterior of the wall of the inner clamp element and is configured to reduce the void to secure the conductor to the battery.

In additional embodiments, at least a part of the conductor is integral with the inner clamp element.

In additional embodiments, the outer clamp element includes a segment with internal threads and the exterior of the wall of the inner clamp element includes external threads.

In additional embodiments, the inner clamp element has a rib projecting into the hollow interior. The rib is configured to imbed into the post when the outer clamp element is mated with the inner clamp element.

In additional embodiments, the inner clamp element includes an annular segment and includes a polygonal segment that has flat sides and is disposed adjacent the annular segment.

In additional embodiments, the inner clamp element includes an arm extending from the wall and terminating at a connector that is configured to mate with the conductor.

In additional embodiments, the outer clamp element includes an annular segment and includes a polygonal segment that has flat sides and is disposed adjacent the annular segment.

In additional embodiments, the inner clamp element has a rib projecting into the hollow interior, and threads on the exterior of the wall. The notch extends through and bisects the rib and the threads.

In additional embodiments, the wall includes external threads that are tapered, and the outer clamp element includes internal threads that are tapered and that mate with the external threads. The external threads taper down in a direction away from the battery so that the outer clamp element is configured, when threaded onto the inner clamp element, to increasingly close the notch and tighten the inner clamp element on the post.

In a number of additional embodiments, a battery connection system includes a battery that has a terminal post. A conductor is configured to connect with the terminal post. An inner clamp element fits over the post and has a wall that is shaped to mate with the post and that defines a hollow interior. The wall has an exterior with external threads that are tapered. The wall has a notch defining a void in the wall. An outer clamp element includes internal threads that are tapered and that mate with the external threads. The external threads taper down in a direction away from the battery so that the outer clamp element is configured, when threaded onto the inner clamp element, to increasingly close the notch and tighten the inner clamp element on the post.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In one or more exemplary embodiments related to battery connection systems and as described herein, a compression clamp approach to connecting with a terminal post provides secure and reliable connection characteristics. For example, the compression clamp includes inner and outer elements that when in the process of being mated together, increasingly tighten the compression clamp onto the battery's post. This connection system offers superior holding power to resist separation during a contact or impact event that may apply force to the clamp, and produces other desirable results as further described below. In certain embodiments as described herein, a battery connection system includes a conductor configured to connect with a battery that has a post. An inner clamp element has a wall that is shaped to mate with the post and that defines a hollow interior and an exterior. The wall has a notch defining a void in the wall. An outer clamp element mates with the exterior of the wall of the inner clamp element to reduce the size of the void to secure the conductor to the battery. For example, the outer clamp element is configured to engage with the inner clamp element and compress the inner clamp element against the post. In a number of embodiments, application of the outer clamp element causes a radially directed inward force from the inner clamp element against the battery post. This more evenly distributes the force around the battery post than traditional two arm clamps that are squeezed on one side of the post. While certain embodiments described herein may be related to vehicle applications, the disclosure is not limited to vehicles, but rather is applicable to any application where improved battery connection is desirable.

Figure 1:
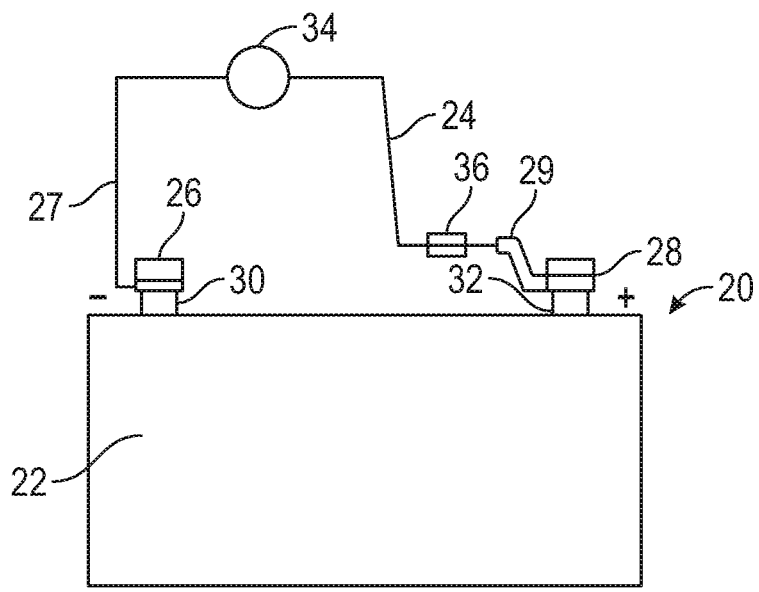
FIG. 1 is a schematic illustration of a battery connection system, in accordance with various embodiments.

Referring to FIG. 1, a battery connection system 20 is illustrated in schematic form and generally includes a battery 22, a load circuit 24 and clamp assemblies 26, 28 for connecting the load circuit 24 with the battery 22. Specifically, the clamp assembly connects a conductor 27 with the battery 22 and the clamp assembly 28 connects another conductor 29 with the battery 22. In the current embodiment, the battery 22 is configured as a vehicle battery with posts 30, 32 that serve as terminal connections. Generally, the post 30 is a negative terminal and the post 32 is a positive terminal. In other embodiments, the battery 22 may have any number of terminals. In addition, the terminals may be located at other locations of the battery 22, such as one or more of the sides, ends, or the bottom. In this embodiment, the posts 30, 32 are top posts. The battery 22 may be for a twelve-volt system or may be configured to deliver any voltage required for the application in which it operates. The load 34 may be any device, or multiple devices, that require a battery as a power source. In this embodiment, the load circuit 24 includes a pre-fuse 36, which may be mounted on top of the battery 22 in an enclosure (not shown).

The clamp assemblies 26, 28 connect the load circuit 24 with the battery 22 at the posts 30, 32, and as noted above, in this embodiment serve as negative and positive terminals, respectively. The clamp assemblies 26, 28 are configured to releasably connect to the posts 30, 32 so that the battery 22 may be removed and/or replaced in service. Accordingly, the clamp assemblies 26, 28 may be repeatedly disconnected and reconnected over their service life, and so ease of connection is provided. In addition, it is desirable for the clamp assemblies 26, 28 to remain attached to the battery 22, even if the battery is jostled or if the clamp assemblies are subjected to contact or impact loads. By maintaining the connection after such loads, power supply to the load 34 is uninterrupted. For example, the load 34 may include a communication system for which continued operability is desirable.

Figure 2:
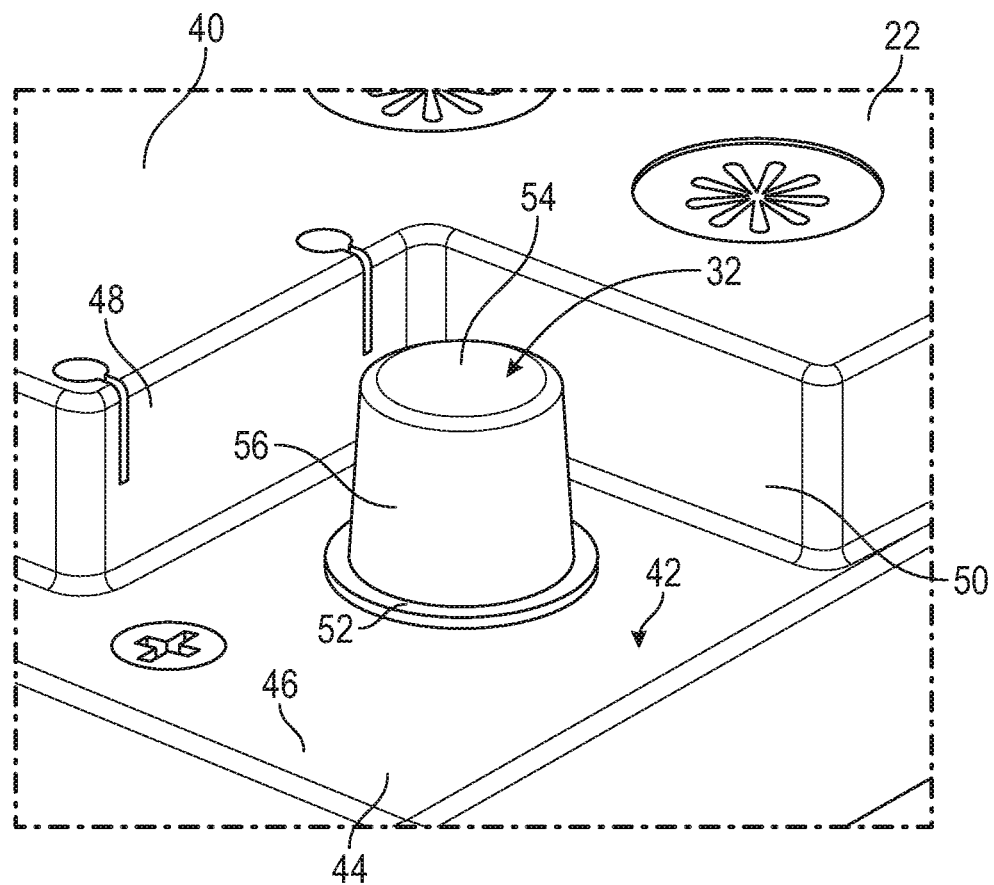
FIG. 2 is a perspective, fragmentary illustration of a part of the battery of FIG. 1, in accordance with various embodiments.

Referring to FIG. 2, a detail of the battery 22 is illustrated showing the area around the post 32, which in this embodiment is the positive terminal. The post 32 is located at the top 40 of the battery 22 in a recess 42. The recess 42 is formed as a depression at the corner 44 of the battery 22. The recess 42 is defined by a flat area 46 of the battery's case adjacent the corner 44, which is bounded on two sides by walls 48, 50 that extend upward from the flat area 46. As such, the space available for making a connection with the post 32 is limited by the nearby walls 48, 50. The post 32 extends upward from the flat area 46 from a base 52 to a terminal end at it top 54. The post 32 has a height that is about the same as the height of the walls 48, 50, which provide some protection to the post 32. In this embodiment, the post 32 is a round terminal with both the base 52 and the top 54 having a round shape. The side 56 of the post 32 tapers down slightly from the base 52 to the top 54 so that the base 52 has a larger diameter than the top 54. In other embodiments the side 56 is not tapered.

Figure 3:
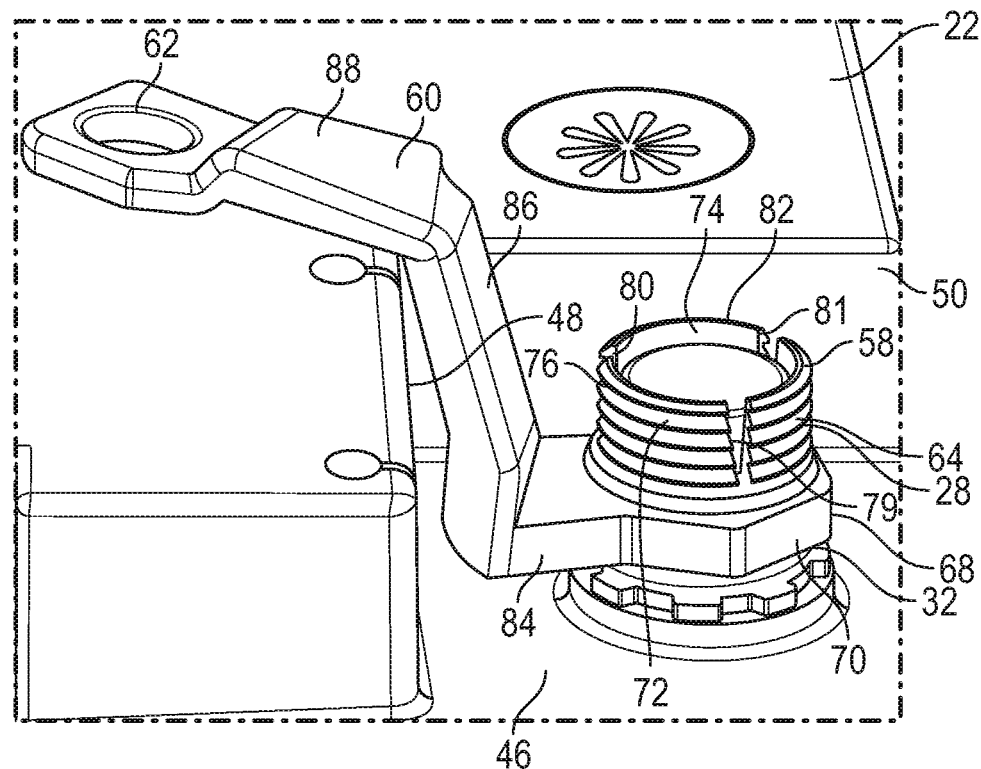
FIG. 3 is a perspective, fragmentary illustration of a part of the battery of FIG. 1 with an inner clamp element placed on the battery, in accordance with various embodiments.

As shown in FIG. 3, an inner clamp element 58 of the clamp assembly 28 is shown positioned onto the post 32. In this embodiment, the inner clamp element 58 includes an arm in the form of a Z-bracket 60 that extends over and upward and terminates in a connector 62. The Z-bracket 60 positions the connector 62 at a convenient location for connecting with the pre-fuse 36. The connector 62 is configured to mate with the conductor 29. In other embodiments, the Z-bracket 60 may be a part of the conductor 29. In other embodiments, the inner clamp element 58 is configured to attach to directly to a conventional battery cable (not shown) without the Z-bracket 60, or the conductor 29 may take another form.

The inner clamp element 58 includes an annular segment 64 and a polygonal segment 68 that has flat sides 70 and is disposed adjacent to the annular segment 64. In the current embodiment, the polygonal segment 68 is positioned closer to the flat area 46 than is the annular segment 64 so that the annular segment 64 is presented outward from the battery 22. The inner clamp element 58 has a wall 72 that is shaped to mate with the post 32 and that defines a hollow interior 74. The wall 72 has an exterior that includes external threads 76. A series of three notches 79-81 are formed in the wall 72 from its top end 82 toward the polygonal segment 68. The notches 79-81 do not extend into the polygonal segment 68 to maintain its strength. The notches 79-81 may be cut or may be otherwise formed in the inner clamp element 58 during its fabrication.

The Z-bracket 60 is an integral part of the inner clamp element 58 in the current embodiment. The Z-bracket 60 includes a segment 84 that is substantially parallel to the flat area 46 and is oriented to extend from the polygonal segment 68 toward the wall 48. The length of the segment 84 is such that it ends short of the wall 48. The Z-bracket 60 includes a segment 86 that extends upward from the segment 86 and extends higher than the wall 48 so that a segment 88 extends over the wall 48 and above the top 40 of the battery 22. The connector 62 is located at the terminal end of the segment 88 and is also located above the top 40 of the battery 22. In other embodiments, the inner clamp element 58 may omit the Z-bracket 60, which may be a separate piece or may not be used.

Figure 4:
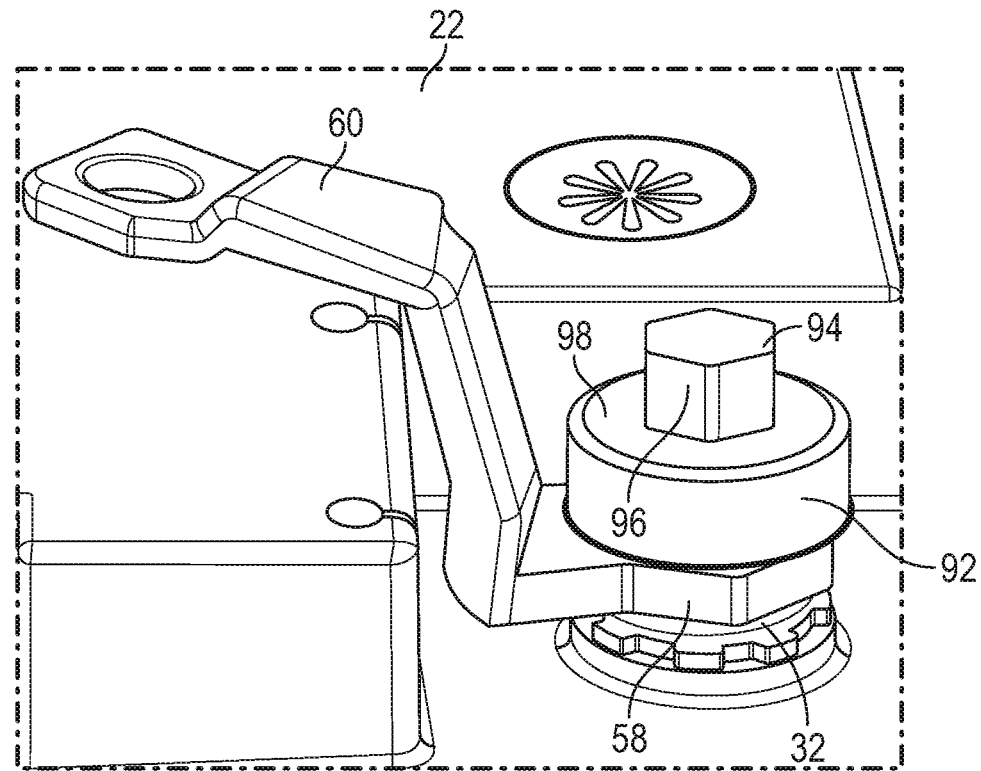
FIG. 4 is a perspective, fragmentary illustration of a part of the battery of FIG. 1 with inner and outer clamp elements placed on the battery, in accordance with various embodiments.

Referring to FIG. 4, an outer clamp element 90 is mated with the inner clamp element 58 and is configured to reduce the size of the voids in the notches 79-81 to secure the inner clamp element 58 and the connected conductor 29 to the battery 22. The outer clamp element 90 includes an annular segment 92 that is round and hat-shaped and includes a polygonal segment 94 that has flat sides 96 and is disposed adjacent the annular segment 92. In this embodiment, the polygonal segment 94 is disposed on the top 98 of the annular segment and is hexagonal. As such, the polygonal segment 94 is readily accessible and is configured to be engaged by a common tool such as a wrench or driver for easy application and removal.

Figure 5:
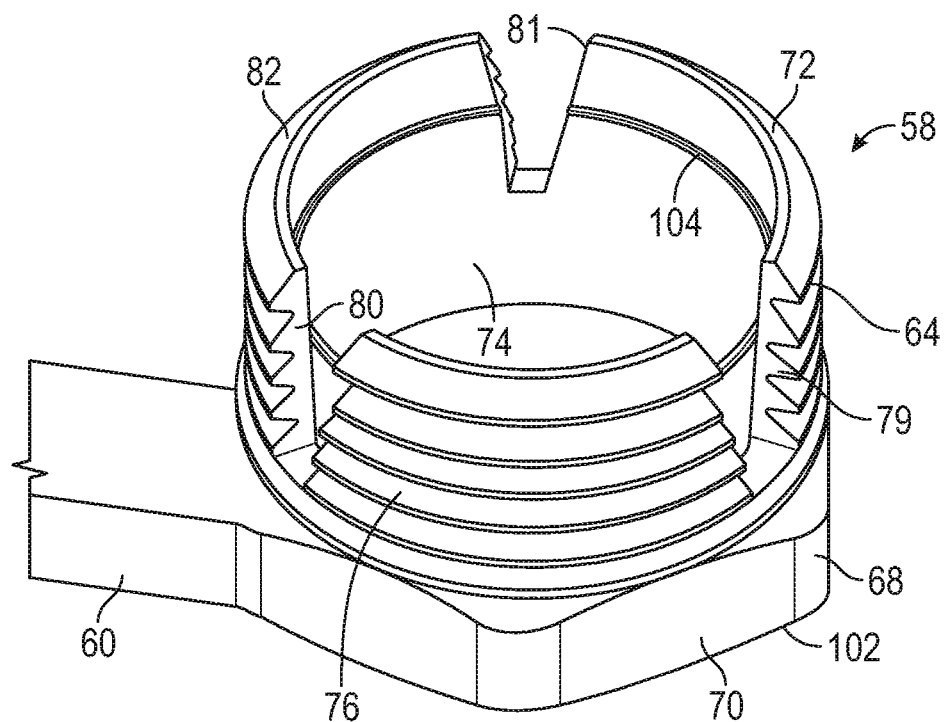
FIG. 5 is a perspective detail illustration of the inner clamp element of FIG. 3 in isolation, in accordance with various embodiments.

Referring to FIG. 5, a part of the inner clamp element 58 is shown in isolation. The hollow interior 74 extends completely through the inner clamp element 58 from the bottom end 102 of the polygonal segment 68 to the top end 82 of the annular segment 64. A feature, which in the current embodiment is a rib 104 is formed by the wall 72 and projects into the hollow interior 74. The rib 104 is annular in shape, extending around the hollow interior 74. The rib extends away from the inside of the wall 72 so that is provides a gripping action to secure the inner clamp element 58 on the post 32. Accordingly, the rib 104 is configured to imbed into the post 32 when the outer clamp element 90 is mated with the inner clamp element 58 and threaded thereon. Each of the notches 79-81 extends through and bisects both the rib 104 and all of the threads 76. Accordingly, the rib 104 is divided by the three notches 79-81 into three arcs. Similarly, the annular segment 64 is divided into three parts by the notches 79-81, which each extend through the entire depth of the threads 76 to the polygonal segment 68. In other embodiments, instead of the rib 104, the feature may be one or more teeth, lugs, ridges or other projections configured to hold the inner clamp element 58 to the post 32, such as during assembly onto the battery 22.

Figure 6:
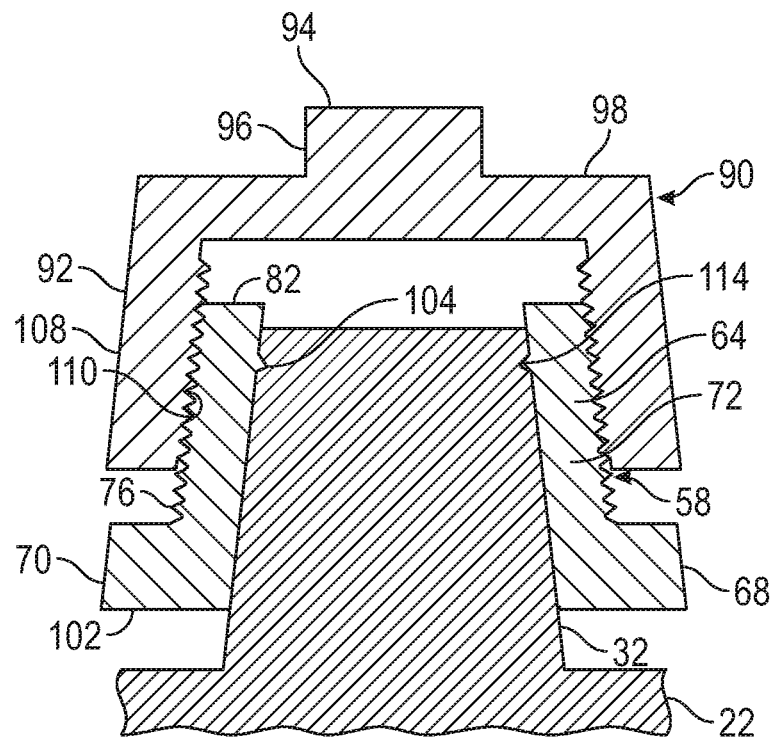
FIG. 6 is a fragmentary, schematic, cross-sectional illustration of the battery and inner and outer clamp elements of FIG. 4, in accordance with various embodiments.

In FIG. 6, the battery connection system 20 is shown in cross section with the inner clamp element 58 positioned on the post 32 and the outer clamp element 90 mated with the inner clamp element 58. The outer clamp element 90 includes a segment 108 with internal threads 110, which mate with the external threads 76 on the exterior of the wall 72 of the inner clamp element 58. The external threads 76 that are tapered down in a direction away from the bottom end 102 and toward the top end 82 of the annular segment 64. Accordingly, the diameter of the thread 76 at the top end 82 is smallest and the thread diameters increase moving away from the top end 82. The internal threads 110 are tapered and mate with the external threads 76. The internal threads 110 are tapered so that the thread 110 at the top has the smaller diameter, with the threads having increasing diameters moving downward. Accordingly, the outer clamp element 90 is configured, when threaded onto the inner clamp element 58, to increasingly close the notches 79-81 and tighten the inner clamp element 58 on the post 32. In addition, the threads provide an indicator of when the assembly is completed, such as when the threads are fully engaged. As the tightening occurs, the rib 104 is imbedded into the post 32 self-forming a groove 114. In other embodiments only one of the external threads 76 or the internal threads 110 are tapered. Removal of the outer clamp element 90 simply requires unscrewing from the inner clamp element 58. Removal of the inner clamp element 58 requires spreading the wall 72 to expand the notches 79-81 to back the rib 104 out of the groove 114 prior to being lifted off. The rib 104 adds to the grip strength of the clamp assembly 28. In other embodiments, the inner and outer clamp elements 58, 90 connect together by features other than threads such as through compression, crimping, snapping, clips, fasteners, or other connecting means.

Figure 7:
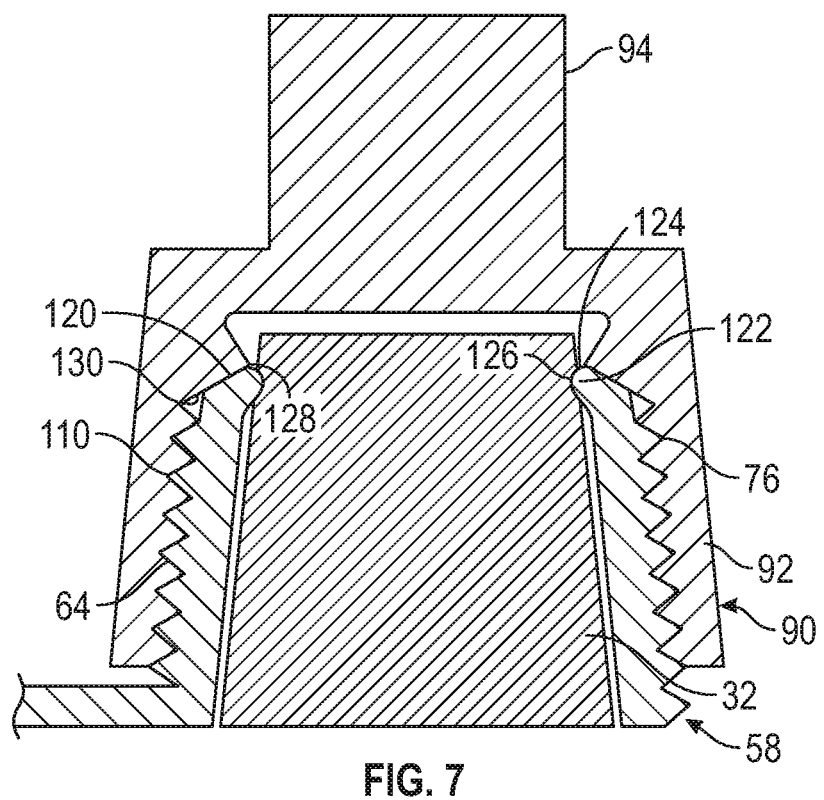
FIG. 7 is a fragmentary, schematic, cross-sectional illustration of a battery post and inner and outer clamp elements, in accordance with various embodiments.

In an embodiment as schematically illustrated in FIG. 7, the inner clamp element 58 includes an upper end 120 with a compression lip 122 that has a rounded outer surface 124 from a tip 126 to the first of the threads 76. The outer clamp element 90 has a rim 128 on its inside at the end of the threads 110. The rim has an angled wall 130 that is configured to mate with the compression lip 122. The inner clamp element 58 is positioned on the post 32 and outer clamp element 90 is threaded onto the inner clamp element 58. When the rim 128 contacts the compression lip 122, further rotation of the outer clamp element 90 forces the tip 126 to imbed in the post 32. In addition, the threads 110 force the annular segment 64 against the post 32 for good surface contact. Accordingly, mating the outer clamp element 90 with the inner clamp element 58 secures the clamp assembly 28 on the battery post 32.

Through the above described battery connection system, a compression clamp approach provides secure and reliable connection characteristics. The exemplary compression clamp includes inner and outer elements that in the process of being mated together, increasingly tighten the compression clamp onto the battery's post. This connection system offers superior holding power to resist separation and is easily connected to a battery in a releasable manner.

It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A battery connection system comprising:
a conductor configured to connect with a battery that has a post;
an inner clamp element configured to fit over the post, wherein the inner clamp element has a wall that defines a hollow interior and an exterior, wherein the wall has a notch defining a void in the wall; and
an outer clamp element configured to mate with the exterior of the wall of the inner clamp element with a mating segment of the outer clamp element receiving and surrounding the wall of the inner clamp element, and the outer clamp element configured to reduce the void to secure the conductor to the battery.

2. The system of claim 1, wherein the conductor is integral with the inner clamp element.

3. The system of claim 1, wherein the outer clamp element is configured to engage with the inner clamp element by threading onto and over the inner clamp element, and to compress the inner clamp element against the post.

4. The system of claim 1, wherein the inner clamp element has a feature projecting into the hollow interior, wherein the feature is configured to inhibit vertical movement of the inner clamp element when the outer clamp element is mated with the inner clamp element.

5. The system of claim 1, wherein the inner clamp element includes an annular segment and a polygonal segment that has flat sides and is disposed adjacent the annular segment.

6. The system of claim 1, wherein the inner clamp element includes an arm extending from the wall and terminating at a connector configured to mate with the conductor.

7. The system of claim 1, wherein the outer clamp element includes an annular segment and a polygonal segment that has flat sides and is disposed adjacent the annular segment.

8. The system of claim 1, wherein the inner clamp element has a rib projecting into the hollow interior, and threads on the exterior of the wall, wherein the notch extends through and bisects the rib and the threads, wherein the rib is configured to imbed into the post when the outer clamp element is mated with the inner clamp element.

9. The system of claim 1, wherein the wall includes external threads that are tapered, and the outer clamp element includes internal threads that are tapered and that mate with the external threads.

10. The system of claim 9, wherein the external threads taper so that the outer clamp element is configured, when threaded onto the inner clamp element, to increasingly close the notch and tighten the inner clamp element on the post.

11. A battery connection system comprising:
a conductor configured to connect with a battery that has a post;
an inner clamp element configured to fit over the post, wherein the inner clamp element has a wall that defines a hollow interior and an exterior, wherein the wall has a notch defining a void in the wall; and
an outer clamp element that mates with the exterior of the wall of the inner clamp element and that is configured to reduce the void to secure the conductor to the battery,
wherein the outer clamp element includes an annular segment and a polygonal segment that has flat sides and is disposed adjacent the annular segment.

12. The system of claim 11, wherein at least a part of the conductor is integral with the inner clamp element.

13. The system of claim 11, wherein the outer clamp element includes a segment with internal threads and the exterior of the wall of the inner clamp element includes external threads.

14. The system of claim 11, wherein the inner clamp element has a rib projecting into the hollow interior, wherein the rib is configured to imbed into the post when the outer clamp element is mated with the inner clamp element.

15. The system of claim 11, wherein the inner clamp element includes an inner annular segment and an inner polygonal segment that has second flat sides and is disposed adjacent the annular segment.

16. The system of claim 11, wherein the inner clamp element includes an arm extending from the wall and terminating at a connector configured to mate with the conductor.

17. The system of claim 11, wherein the outer clamp element includes threads in the annular segment, wherein the annular segment is threaded onto the inner clamp element.

18. The system of claim 11, wherein the inner clamp element has a rib projecting into the hollow interior, and threads on the exterior of the wall, wherein the notch extends through and bisects the rib and the threads.

19. The system of claim 11, wherein the wall includes external threads that are tapered, and the outer clamp element includes internal threads that are tapered and that mate with the external threads, wherein the external threads taper down in a direction away from the battery so that the outer clamp element is configured, when threaded onto the inner clamp element, to increasingly close the notch and tighten the inner clamp element on the post.

20. A battery connection system comprising:
a battery having a terminal post;
a conductor configured to connect with the terminal post;
an inner clamp element configured to fit over the terminal post, wherein the inner clamp element has a wall that defines a hollow interior, wherein the wall has a notch defining a void in the wall; and
an outer clamp element that mates with the exterior of the wall of the inner clamp element, the outer clamp element configured to reduce the void to secure the conductor to the battery,
wherein the inner clamp element includes an annular segment and a polygonal segment that has flat sides and is disposed adjacent annular segment threads.

* * * * *